Jan. 29, 1957 D. V. GEPPERT 2,779,902

SEMI-CONDUCTOR UNIT

Filed May 15, 1953

INVENTOR.
Donovan V. Geppert.
BY
Norman L. Mueller
Atty.

2,779,902

SEMI-CONDUCTOR UNIT

Donovan V. Geppert, Phoenix, Ariz., assignor to Motorola, Inc., Chicago, Ill., a corporation of Illinois Application May 15, 1953, Serial No. 355,336

9 Claims. (Cl. 317—235)

The present invention relates to semi-conductor transistor assemblies, and more particularly to an improved transistor assembly of the point-contact type.

The point contact type of transistor usually comprises a crystal of semi-conductive material such as germanium or silicon that has been treated to exhibit, for example, "N" or negative characteristics when a "P-N-P" type point contact transistor is desired, or "P" or positive characteristics when an "N-P-N" type point contact transistor is desired.

The point contact type of transistor includes a pair of electrodes known respectively as the emitter and collector whose extremities contact a surface of the crystal. A further electrode, which is usually in the form of a metal block or tab, is also provided and affixed to another surface of the crystal to constitute what is termed a base electrode for the assembly.

The emitter and collector electrodes in the prior art point contact transistors usually take the form of a pair of fine wires or thin metallic ribbons. However, the use of such fine wires for the emitter and collector electrodes, whose diameter is of the order of .005" and whose spacing is of the order of .002", renders the manufacture of this type of transistor relatively complicated since critical manual spacing and mounting operations must be made to assemble the electrodes in contact with the crystal which is usually a cube with a dimension of about .032" on a side. In addition, due to the requirement for precise manual spacing of the aforementioned electrodes, it is difficult to achieve uniformity of characteristics in transistors so constructed. Moreover, the use of fine wires for the collector and emitter electrodes in point contact transistor assemblies usually results in a unit having a relatively low mechanical stability due to the inherent nature of the construction.

The use of such fine wires for the emitter and collector electrodes also constitutes a limitation on the power capabilities of the transistor because the power output is in part dependent on the heat dissipating capacity of the electrodes. Therefore, when electrodes are used whose heat dissipating capacity is inherently limited, the power output capabilities of the transistor are correspondingly limited as is the amount of current that can safely be passed through the device without damaging the electrodes.

It is accordingly an object of the invention to provide an improved transistor assembly of the point contact type that may be manufactured easily and with a minimum of mechanical skill, and which is so constructed that uniform characteristics may be obtained when quantities of transistor units of this type are manufactured.

Another object of the present invention is to provide such an improved transistor assembly of the point contact type which is constructed to have relatively high power handling capabilities as compared with the prior art devices of this type.

Yet another object of the invention is to provide such an improved transistor assembly that is rugged in construction and possesses a high degree of mechanical stability.

A feature of the invention is the provision of a transistor unit in which the collector and emitter electrodes have the form of metallic sheets supported on one side of an insulating panel with corners of the sheets making respective contact with a semi-conductive crystal to constitute the emitter and collector electrodes therefor.

The above and other features of the invention which are believed to be new are set forth with particularity in the appended claims. The invention itself, however, together with further objects and advantages thereof, may best be understood by reference to the following description when taken in conjunction with the accompanying drawing in which:

The present invention provides a circuit element in the form of a transistor assembly which includes a block of semi-conductive material such as a germanium crystal. The crystal has a pair of inclined faces forming a line of juncture therebetween, and an insulating panel is disposed in a plane traversing such line of juncture. A pair of metallic surfaces is disposed on the insulating panel and separated and insulated one from the other, and each metallic surface has a corner in contact with the crystal on opposite sides of the aforementioned line of juncture. In this manner, the metallic surfaces constitute respectively the emitter and collector electrodes for the crystal.

Figure 1:
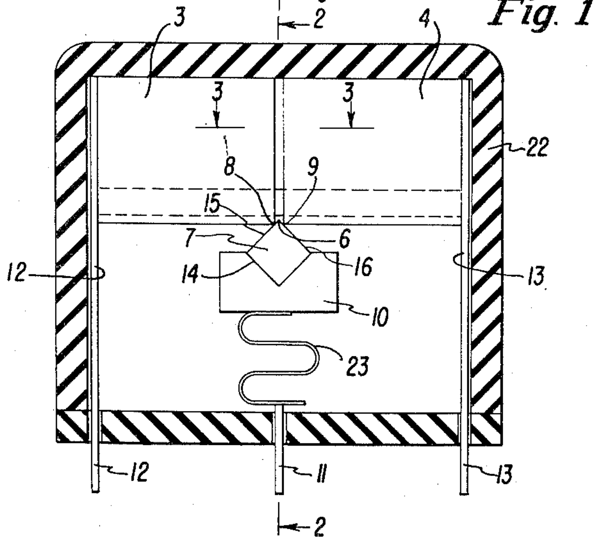
Figure 1 is a front elevation view, partly in section, of one embodiment of the invention.
Figure 2:
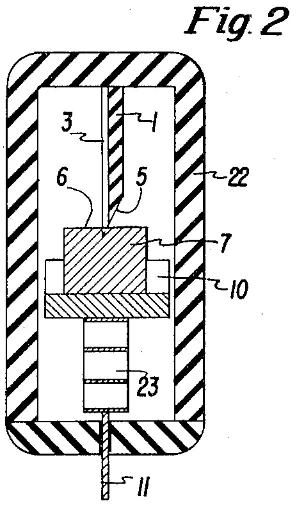
Figure 2 is a sectional view of the invention taken along the lines 2—2 of Figure 1.
Figure 3:
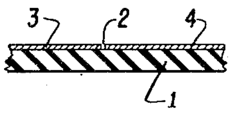
Figure 3 is a fragmentary sectional view taken along the lines 3—3 of Figure 1.

Referring now to Figures 1–3, in which the transistor assembly of the invention is illustrated on an enlarged scale for purposes of clarity. The assembly includes a metallic block 10 which, for example, may be brass or any other suitable metal, and which has a V-shaped groove or crevice 14 formed in the upper surface. A parallelopiped-shaped block 7 of semi-conductive material such as an N type germanium crystal is supported within crevice 14 with a pair of its sides lying along the sides of the crevice with the line of juncture between these sides disposed at the apex of the crevice. The semi-conductive crystal 7 is maintained within the crevice by a suitable solder bond between its aforementioned sides and the sides of the crevice in metallic block 10. Metallic block 10 forms a base electrode for the crystal 7, and it has proved advantageous to mount the crystal within a groove in the metallic block since such an arrangement is ideally suited for receiving the crystal which usually has a commercial form of a parallelopiped, and with such a mounting arrangement no further cutting operations on the crystal are required as is the case, for example, when the crystal is mounted on the flat surface of a base such as block 10.

As shown in the drawing, crystal 7 has an upper line of juncture 6 between two adjacent inclined faces 15, 16; the line of juncture 6 being disposed opposite to the aforementioned line of juncture of the faces of crystal 7 within crevice 14. The emitter electrode 3 and collector electrode 4 of the assembly have the form of metallic surfaces which are supported on an insulating panel 1 and which are separated and insulated one from the other by a slit 2 running transversely across panel 1. Panel 1, for example, may be a cooper-clad insulating board, with the transverse slit 2 being cut or etched through the bonded copper portion from edge to edge, thus forming two insulated copper sheets 3 and 4 spaced along their adjacent edges by the width of the slit. These copper sheets, for example, may each have a length 3/16" and a width of 3/32".

The insulating panel 1 is disposed perpendicular to line of juncture 6 in a plane traversing such line of juncture and the panel and sheets 3 and 4 have a beveled edge 5, the bevel being, for example, 45°. The insulating panel is so disposed on the line of juncture 6, that the line of juncture is wedged into the slit 2 between the copper sheets 3 and 4 without interference from the insulating panel 1 due to beveled edge 5. Moreover, the beveled edge produces sharp corners 8 and 9 on the copper sheets when they contact the crystal. One corner 8 of sheet 3, therefore, makes a sharp point contact with crystal 7 on one side of line of juncture 6, and a corresponding corner 9 of sheet 4 makes a sharp point contact with the crystal on the opposite side of the line of juncture.

The entire assembly may be mounted in a suitable housing or casing 22 in which electrodes 3 and 4 are rigidly supported, and block 10 is supported within the casing by a resilient compression spring 23 and urged upwardly so that the line of juncture 6 of crystal 7 is forced into slit 2 with the aforementioned corners of sheets 3 and 4 making a respective point contact with the crystal on either side of the line of juncture. Electrical connection may be made to block 10 by a metallic pin 11 connected to resilient spring 23 and connections may be made to electrodes 3 and 4 by respective metallic pins 12 and 13 secured on the electrodes and extending through the bottom of housing 22.

With the construction described above, a positive and rigid point contact is made between the corners 8 and 9 of metallic sheets 3 and 4 so that these sheets may respectively form the emitter and collector electrodes for the assembly. Due to the relatively large area of the aforementioned sheets, the transistor assembly is capable of handling larger amounts of power than those of the prior art which uses fine wire electrodes, and also the sheets 3 and 4 have a higher burn-out capacity than such prior art units.

The assembly may be constructed easily and conveniently since there is no need critically to space fine wire electrodes, and the spacing between the point contact corners 8 and 9 may be precisely made by any well-known etching or cutting operation in the formation of slit 2. Moreover, owing to the fact that the spacing between the emitter and collector electrodes 3 and 4 is not set manually but is determined simply by the width of the slit separating the two copper sheets, the transistor assembly of the present invention may be produced in large quantities and such mass produced units may have uniform characteristics. Mechanical stability is also achieved due to the wedging action of the line of juncture 6 of crystal 7 into slit 2 between corners 8 and 9 which impedes motion between the crystal and the electrodes 3 and 4.

It is to be noted that in the resulting assembly, a tip of the crystal is disposed between the corners 8 and 9 of electrodes 3 and 4, which corners make point contact with the crystal on either side of the line of juncture 6 at such tip. With this construction the extent of the paths of the electrical charges or "holes," for P-N-P transistors, from emitter to collector are limited by the wedge shape of the tip of the crystal between the electrodes. This limits phase dispersion within the transistor which is prevalent in the prior type of transistor using fine wire electrodes on a plane semi-conductor surface. The result of this is that the transistor of the present invention may be used in conjunction with signals of frequencies beyond the capabilities of the prior art transistors. This obtains because the effects of phase dispersion become more and more pronounced as the frequency increases.

Figure 4:
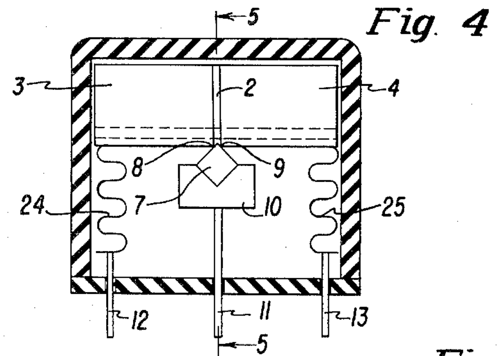
Figures 4 and 5 represent views similar to Figures 1 and 2 of a modification of the invention.
Figure 5:
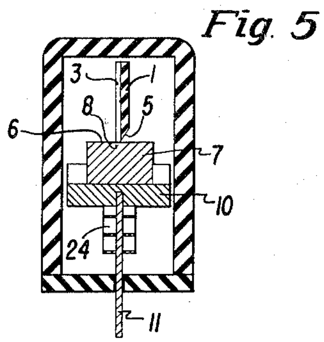

The embodiment shown in Figures 4 and 5 is essentially similar to that of Figures 1 and 2, except that metallic pin 11 is continued and connected directly to base 10 to form a rigid support for crystal 7, and the emitter and collector electrodes 3 and 4 are connected to metallic pins 12 and 13 through a pair of metallic tension springs 24 and 25. These springs resiliently tension the electrodes 3 and 4 downwardly on crystal 7 with corners 8 and 9 in point contact with the crystal on either side of line of juncture 6, as in the previous embodiment.

Figure 6:
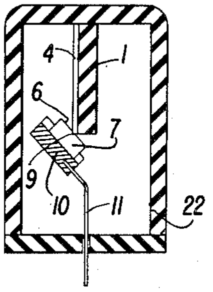
Figure 6 shows another modification of the invention.

In the embodiment of Figure 6, there is no need to bevel the edges of the electrodes 3 and 4, or of insulating panel 1. Instead, crystal 7 is resiliently held by metallic pin 11 in an inclined position relative to electrodes 3 and 4, with the line of juncture 6 extending into slit 2. With this latter arrangement, the corners 8 and 9 of the electrodes make sharp point contact with the crystal, as previously, without interference by the insulating panel 1.

The invention provides, therefore, a simple and rugged transistor unit having relatively high power handling capabilities and improved frequency characteristics, and which may be constructed cheaply and conveniently.

While particular embodiments of the invention have been shown and described, modifications may be made and it is intended in the appended claims to cover all such modifications as fall within the true spirit and scope of the invention.

I claim:

1. A circuit element including in combination, a block of semi-conductive material having a pair of mutually inclined faces forming a line of juncture therebetween, an insulating panel disposed in a plane traversing such line of juncture, and at least one metallic surface disposed on said insulating panel and having a corner in contact with said block adjacent such line of juncture, said metallic surface thereby constituting an electrode for said block.

2. A circuit element including in combination, a block of semi-conductive material having a pair of inclined faces forming a line of juncture therebetween, an insulating panel disposed in a plane traversing such line of juncture, and a pair of metallic surfaces disposed on said insulating panel separated and insulated one from the other and each having a corner in contact with said block on opposite sides of such line of juncture, said metallic surfaces thereby constituting a pair of electrodes for said block.

3. A circuit element including in combination, a block of semi-conductive material having a pair of inclined faces forming a line of juncture therebetween, an insulating panel disposed in a plane traversing such line of juncture, and a pair of metallic surfaces disposed on one side of said insulating panel separated one from the other to form a slit therebetween, the aforesaid line of juncture extending into the aforesaid slit, and each of said metallic surfaces having a corner in contact with said block on opposite sides of such line of juncture.

4. A circuit element including in combination, a block of semi-conductive material having a pair of inclined faces forming a line of juncture therebetween, an insulating panel traversing such line of juncture and disposed perpendicular thereto, and a pair of metallic surfaces disposed on one side of said insulating panel separated and insulated one from the other and each having a corner in contact with said block on opposite sides of such line of juncture, said metallic surfaces thereby constituting a pair of electrodes for said block.

5. A circuit element including in combination, a block of semi-conductive material having a pair of inclined faces forming a line of juncture therebetween, an insulating panel traversing such line of juncture and disposed perpendicular to such line, and a pair of metallic surfaces disposed on one side of said insulating panel separated one from the other to form a slit therebetween, with each of said metallic surfaces having a corner in contact with said block on opposite sides of such line of juncture.

6. A point contact transistor unit including in combination, a germanium crystal having a pair of inclined edges forming a line of juncture therebetween, an insulating panel traversing such line of juncture and disposed perpendicular thereto with an edge thereof contacting such line, and a pair of copper sheets disposed on one side of said insulating panel separated one from the other to form a slit therebetween, with each of said copper sheets having a corner in point contact with said crystal on opposite sides of such line of juncture.

7. A circuit element including in combination, a crystal of semi-conductive material having a pair of inclined faces forming a line of juncture therebetween, an insulating panel traversing such line of juncture and disposed perpendicular thereto with a beveled edge thereof adjacent such line, and a pair of metallic surfaces disposed on one side of said insulating panel separated one from the other to form a slit therebetween extending from the aforesaid beveled edge, with each of said metallic surfaces having a corner in contact with said crystal on opposite sides of such line of juncture.

8. A circuit element including in combination, a semiconductive crystal having a pair of inclined faces forming a line of juncture therebetween, an insulating panel traversing such line of juncture and disposed perpendicular thereto, a pair of metallic surfaces bonded to said panel on one side thereof and separated one from the other to form a slit therebetween, with each of said metallic surfaces having a corner in contact with said crystal on opposite sides of such line of juncture, a base electrode for said crystal affixed thereto and contacting said crystal in opposing relation to said insulating panel, and resilient means contacting said base electrode for biasing the aforesaid line of juncture between the aforesaid respective corners of said metallic sheets.

9. A circuit element including in combination, a block of semi-conductive material having a pair of mutually inclined faces forming a line of juncture therebetween, and a pair of uniplanar electrically conductive plate members disposed in a plane traversing said line of juncture, each of said plate members having a corner in contact with said block adjacent said line of juncture, thereby forming electrodes for said block.

References Cited in the file of this patent

UNITED STATES PATENTS

| | | |
|---|---|---|
| 2,595,475 | McLaughlin | May 6, 1952 |
| 2,609,429 | Law | Sept. 2, 1952 |
| 2,629,767 | Nelson et al. | Feb. 24, 1953 |
| 2,695,979 | Creighton | Nov. 30, 1954 |
| 2,696,574 | Rich | Dec. 7, 1954 |
| 2,696,575 | Fogg | Dec. 7, 1954 |